UNITED STATES PATENT OFFICE.

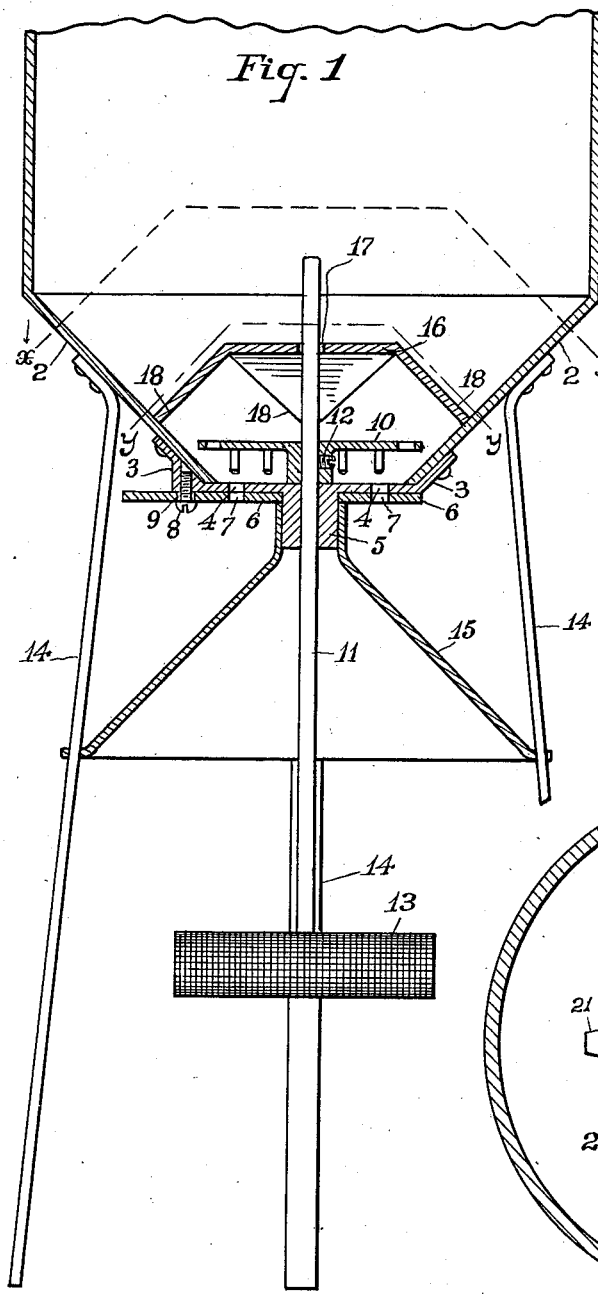
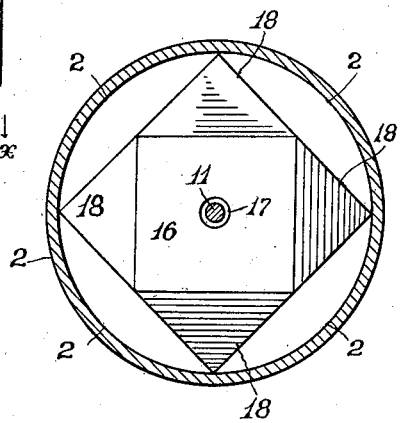
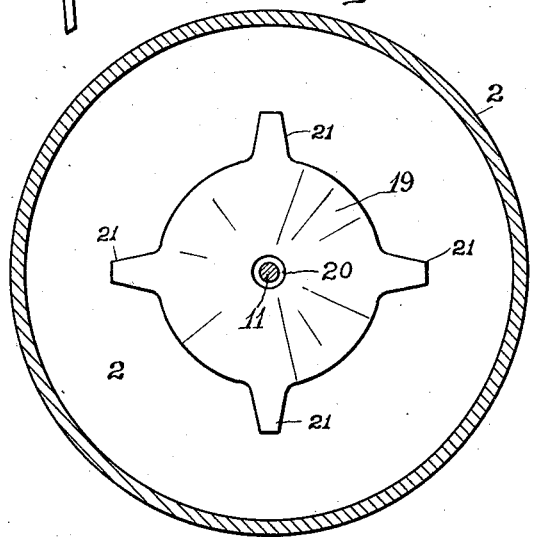

FRANK ENOS, JR., OF NORWICH, CONNECTICUT, ASSIGNOR TO THE NORWICH AUTOMATIC FEEDER CO., OF NORWICH, CONNECTICUT, A CORPORATION OF CONNECTICUT.

POULTRY FEEDER AND EXERCISER.

1,023,365.  Specification of Letters Patent.  Patented Apr. 16, 1912.

Application filed May 4, 1911. Serial No. 624,913.

*To all whom it may concern:*

Be it known that I, FRANK ENOS, Jr., a citizen of the United States, residing in the city of Norwich, county of New London, State of Connecticut, have invented certain new and useful Improvements in Poultry Feeders and Exercisers; and I do declare the following to be a full, clear, and exact description of the invention, such as will enable others skilled in the art to which it appertains to make and use the same.

My invention relates to certain new and useful improvements in poultry feeders and exercisers, but more particularly relates to means for preventing the overweighting of the agitator device, the object of my invention being to free said device from as much weight as possible so that the poultry may have no difficulty in turning the bait box which is on the extremity of a rotary rod to which the agitator itself is secured within the hopper.

With this end in view my invention consists in certain constructions and appliances hereinafter fully described and then particularly pointed out in the claim which concludes this description.

In the accompanying drawings—Figure 1 is a sectional elevation of a poultry feeder equipped with my improvement, Fig. 2 a section at the line $y, y$, of Fig. 1, and Fig. 3 a section at the line $x, x$, of Fig. 1 but showing a modification of my improvement.

Similar numerals of reference denote like parts in the several figures of the drawing.

While my improvement is adapted for use in connection with all poultry feeders that employ an agitator to distribute the feed within the hopper and to insure the proper delivery of the feed through suitable openings in the bottom of the hopper, the present invention is illustrated in connection with an approved form of exerciser and feeder shown and described in Letters Patent No. 952,793, issued to me March 22, 1910.

Referring to the accompanying drawing, 1 is the hopper having a tapering bottom portion 2, 3 the bottom plate which is provided with perforations 4 which plate acts as a closure to the tapering portion and is provided with a downwardly extending perforated hub 5, 6 an adjusting plate having perforations 7 and loosely supported around said hub which perforations generally coincide with the perforations 4, said adjusting plate being capable of shifting movements between limits prescribed by the screw 8 which passes through an enlarged slot 9 in said plate into the plate 3, 10 the agitator resting immediately upon the central portion of the plate 3 within the tapering portion of the hopper at the bottom thereof, 11 a rod passed freely through the perforations in the hub 5 and through a corresponding perforation in the agitator plate 10 and secured thereto by means of set screw 12, 13 the bait box suspended from the lower extremity of the rod, 14 suitable legs secured to the hopper and supporting the same, and 15 a conical shaped downwardly flaring spreader whose upper portion is disposed around the hub 5 and whose lower edge is secured to the legs 14, all as shown and described in my Letters Patent above referred to.

It will be readily understood that when the hopper is full of feed, or in fact when there is only a moderate amount of feed therein, the weight upon the agitator 10 will be considerable, and the exertion of the poultry in pecking at the bait box 13 will be greatly reduced by the addition of the shield to relieve the weight upon the agitator 10. My invention aims to overcome this difficulty without interfering with the ample supply feed beneath the agitator so that the movements of the latter can readily effect the discharge of the feed through the openings 4, 7.

In carrying out my invention I prefer to use a rectangular shaped horizontally disposed shield 16 having a perforation 17 at its apex through which the rod 11 loosely extends, and provided with depending inclined projections or legs 18 which, when the device is properly placed within the hopper, rest against the tapering portion 2, so that the shield will be disposed immediately over the agitator as a sort of dome, as shown at Figs. 1 and 2. The feed within the hopper readily passes between the depending legs 18 of the shield 16 and the sides of the tapering portion 2, so that such feed will easily find its way beneath the agitator and the latter will practically be relieved of all superfluous weight. That is to say, the feed will have ready access to the bottom of the hopper through spaces intermediate of the points 18 which rest against the tapering portion 2. The horizontally disposed portion of the shield 16 sustains the main weight of the feed, and the latter will readily flow downwardly across the upper surfaces of the inclined legs 18, and thence over the lateral edges of these legs to the bottom of the hopper, although of course it will be readily understood that more or less of the feed will initially find its way to the bottom of the hopper through the spaces intermediate of the extremities of the legs without coming into contact with the top or horizontal portion of the shield, but it is nevertheless true that this shield relieves the agitator of a great portion of the weight of feed so that the poultry will have no difficulty in revolving the agitator by pecking at the bait box 13.

While I prefer the style of shield above described I do not wish to be limited to any particular shape thereof, it being merely necessary that the shield shall be so constructed as to have points of support which rest against the tapering portion 2 so that spaces intermediate of said points shall be provided for the flow of feed as above set forth. I have therefore shown at Fig. 3 a modification of my improvement in which the shield is in the shape of a cone element 19 centrally perforated at 20 to admit the rod 11, the depending leg portions 21 serving as points of support which rest upon the tapering portion 2 of the hopper, the feed having, as above described, ready access to the bottom of the hopper through the spaces intermediate of such points.

Having thus described my invention what I claim as new and desire to secure by Letters Patent is:—

In a poultry feeder, in combination with the hopper thereof having a tapering lower portion and a bottom formed with discharge openings and feed agitating means above the bottom, a shield formed of a square plate the corner portions of which plate are bent downwardly to extend at an angle to the center of the plate to form a series of depending legs, the free ends of which engage the tapering lower portion of the hopper to support the plate.

In testimony whereof I affix my signature in presence of two witnesses.

FRANK ENOS, Jr.

Witnesses:
  E. J. CAMPBELL,
  F. M. HOMIGAN.

Copies of this patent may be obtained for five cents each, by addressing the "Commissioner of Patents, Washington, D. C."